Sept. 2, 1947.   W. B. BRONANDER   2,426,920
METHOD OF FORMING AND APPLYING COOLING FINS TO TUBULAR MEMBERS
Original Filed Aug. 20, 1942
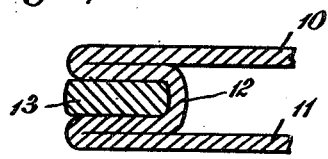
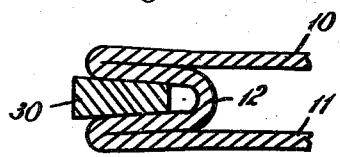
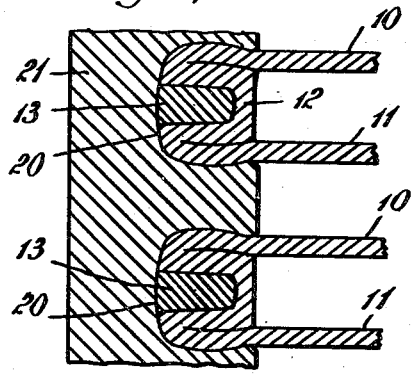
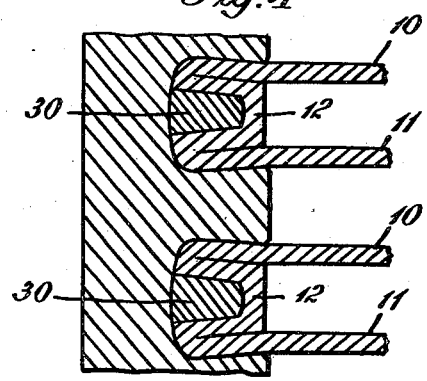
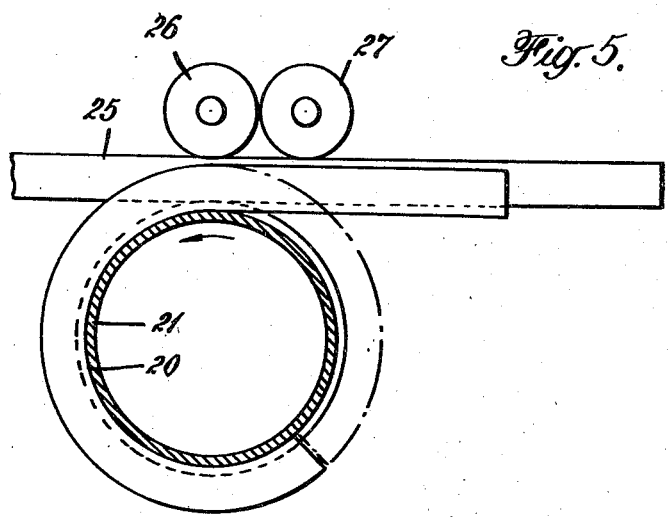
INVENTOR
Wilhelm B. Bronander
BY
ATTORNEY Patented Sept. 2, 1947

2,426,920

UNITED STATES PATENT OFFICE 2,426,920

METHOD OF FORMING AND APPLYING COOLING FINS TO TUBULAR MEMBERS

Wilhelm B. Bronander, Montclair, N. J.

Original application August 20, 1942, Serial No. 455,451, now Patent No. 2,363,224, dated November 21, 1944. Divided and this application November 18, 1944, Serial No. 564,084

3 Claims. (Cl. 29—157.3)

This invention relates to a method of forming and applying a cooling fin or heat exchange element to a tubular member or cylinder and this application is a division of application Serial No. 455,451, filed August 20, 1942 which issued November 21, 1944 as Patent No. 2,363,224.

Cooling fins are usually formed integral with the tube or cylinder or are brazed or soldered thereto. The casting of fins integral with the cylinder involves the use of expensive patterns and fins so cast are brittle. The brazing, welding or soldering of the fins to the tubular members or cylinders is expensive and time consuming and does not always result in a rigid and efficient joint.

This invention has for its salient object to provide a simple, practical and efficient method of forming and applying a cooling fin to a tube, cylinder or other member to be cooled, in such a manner that the method can be expeditiously carried out and will result in forming a firm and rigid connection without requiring brazing, soldering or welding.

Another object of the invention is to provide a joint between a cooling fin and cylinder or tube so formed that heat will be efficiently conducted from the tube or cylinder to the fin.

Further objects of the invention will appear from the following specification taken in connection with the drawings which form a part of this application, and in which Fig. 1 is a sectional elevation, broken away, of a fin structure constructed in accordance with the invention;

Fig. 2 is a sectional elevation through a portion of the wall of a cylinder or other member to be cooled, showing the fin illustrated in Fig. 1 anchored in the grooves therein;

Fig. 3 is a sectional elevation similar to Fig. 1 but illustrating a slightly modified form of the invention;

Fig. 4 is a sectional elevation similar to Fig. 2 but illustrating the fin shown in Fig. 3 anchored in grooves formed in the wall of the member to be cooled; and Fig. 5 is a diagrammatic sectional elevation illustrating means for anchoring the fin structure in the groove of the member to be cooled.

In the form of the invention illustrated in Figs. 1 and 2, the fin structure is formed by bending or otherwise forming the walls 10 and 11 into parallel relation, the walls being connected by a bridge 12 of compressible material. The fin walls and bridge take the form of a W and the legs of the W are spaced apart to receive a strip or wire 13 formed of suitable compressible material.

The walls 10 and 11, the bridge 12 and the strip or wire of compressible material are so dimensioned that the connected edges and the wire can be inserted in a groove 20 formed in the wall 21 of a cylinder or other member to be cooled. It will be noted that the assembled fin unit is inserted with the wire or strip 13 disposed at the bottom of the groove or enclosed within the bridge 12. After the fin strip or unit has been inserted in the groove, pressure is applied to the outer surface of the bridge 12 in some suitable manner and in Fig. 5 there is shown a bar 25 which is engaged and forced downwardly by a roller 26. This bar 25 forces the bridge and the wire or strip 13 against the bottom of the groove and causes the walls 10 and 11 to be forced laterally into firm gripping engagement with the walls of the groove 20, thus firmly anchoring the fin structure in the groove and providing an efficient heat conducting contact between the fin structure and the member 21.

A second roller 27 also engages the upper surface of the bar 25 to press down on the bar and to hold the fin structure in position.

The form of the invention illustrated in Figs. 3 and 4 is very similar to that illustrated in Figs. 1 and 2 but differs therefrom in that the strip or wire 30 of compressible material is tapered and the bridge or connecting portions of the fins is also tapered to receive the tapered strip or wire 30. This fin structure is anchored in the groove in the same manner as that above described and is illustrated in Fig. 4 in its anchored position.

Although certain specific embodiments of the invention have been particularly shown and described, it will be understood that the invention is capable of modification and that changes in the arrangement and in the construction of the various cooperating parts may be made without departing from the spirit or scope of the invention, as expressed in the following claims.

What I claim is:

1. The method of providing a member with radiating fins which consists of forming a groove in the member, forming a double walled fin unit with substantially parallel spaced walls connected at one edge of each wall by a bridge of compressible material integral with the walls and extending toward the free edges of said walls, inserting under said connecting bridge and between the connected edges of the walls a wire of deformable, compressible material, inserting the double walled fins and wire in the groove with the wire at the bottom of the groove, and forcing the fin walls laterally by pressure against the outer portion of said bridge, said pressure upsetting and expanding the deformable wire insert laterally against the fin walls thus compressing the bridge and the wire and anchoring the fin unit in the groove.

2. The method of forming and securing a radiating fin to a grooved member to be cooled which consists of inserting in the groove substantially parallel fin walls, the bottom portion of each wall having an integral portion folded back against said wall, inserting beneath said folded material a wire of deformable, compressible material, inserting the double walled fins and wire in the groove with the wire at the bottom of the groove, and forcing the fin walls laterally by pressure against the outer portion of said folded portions, said pressure upsetting and expanding the deformable wire insert laterally against the fin walls thus compressing the portions and the wire and anchoring the fin unit in the groove.

3. The method of forming and securing a radiating fin to a member which consists of forming a strip of material intermediate the longitudinal edges thereof into W shape with separated substantially parallel walls, inserting a wire of deformable, compressible material beneath the inverted V of the W, inserting the closed edge of the double walled fin and the compressible wire in the groove with the wire engaging the bottom of the groove, and forcing the fin walls laterally into tight gripping engagement with the groove walls by pressure exerted against the portion of the W intermediate the fin walls, said pressure upsetting and expanding the deformable wire insert laterally against the fin walls.

WILHELM B. BRONANDER.

REFERENCES CITED

The following references are of record in the file of this patent:

UNITED STATES PATENTS

| Number | Name | Date |
|---|---|---|
| 2,363,224 | Bronander | Nov. 21, 1944 |
| 754,195 | Bullard | Mar. 8, 1904 |
| 927,075 | Reid | July 6, 1909 |
| 851,977 | Bigsby et al. | Apr. 30, 1907 |
| 2,070,539 | Muhleisen | Feb. 9, 1937 |
| 805,510 | Zent | Nov. 28, 1905 |
| 912,546 | Duryea | Feb. 16, 1909 |